United States Patent
Chen et al.

(10) Patent No.: US 8,857,286 B2
(45) Date of Patent: Oct. 14, 2014

(54) MACHINE TOOL TRANSMISSION SYSTEM

(75) Inventors: Shi-Duang Chen, Hsinchu (TW);
Tay-Cheng Kuo, Hsinchu (TW);
Chin-Lung Huang, Hsinchu (TW)

(73) Assignee: Luren Precision Co., Ltd., Hsinchu (TW)

( * ) Notice: Subject to any disclaimer, the term of this patent is extended or adjusted under 35 U.S.C. 154(b) by 263 days.

(21) Appl. No.: 13/413,414

(22) Filed: Mar. 6, 2012

(65) Prior Publication Data
US 2013/0233105 A1  Sep. 12, 2013

(51) Int. Cl.
F16H 55/08 (2006.01)
F16H 55/10 (2006.01)
F16H 57/04 (2010.01)
F16H 57/12 (2006.01)

(52) U.S. Cl.
USPC .................. 74/467; 74/392; 74/457

(58) Field of Classification Search
CPC ....... F16H 57/043; F16H 55/18; F16H 57/12; F16H 55/17; F16H 57/0493; F16H 57/042; F16H 57/048; F16H 2057/0221
USPC ............... 74/457, 459.5, 460, 467, 392, 393, 74/412 R, 421 A, 421 R; 184/6.12
See application file for complete search history.

(56) References Cited

U.S. PATENT DOCUMENTS

| | | | |
|---|---|---|---|
| 3,043,158 A * | 7/1962 | Herr, Jr. | 74/462 |
| 5,946,975 A * | 9/1999 | Yun | 74/462 |
| 7,028,572 B2 * | 4/2006 | Willmot et al. | 74/393 |
| 7,191,521 B2 * | 3/2007 | Litvin et al. | 29/893.3 |
| 7,537,064 B2 | 5/2009 | Milbourne et al. | |
| 8,201,471 B2 * | 6/2012 | Ohmi et al. | 74/462 |
| 2007/0175706 A1 * | 8/2007 | Shilo et al. | 184/6.12 |

FOREIGN PATENT DOCUMENTS

TW   M390361 U1   10/2010

* cited by examiner

*Primary Examiner* — Justin Krause
(74) *Attorney, Agent, or Firm* — Muncy, Geissler, Olds & Lowe, P.C.

(57) ABSTRACT

A machine tool transmission system includes a driving assembly, a driven gear and at least one transmission gear, at least two positioning gears and at least two retaining gears. The driving assembly includes an input unit and a driving gear driven by the input unit. The transmission gear, positioning gears and retaining gears have respectively a plurality of transmission teeth, positioning teeth and retaining teeth that include respectively a front end tooth and a rear end tooth connecting to the front end tooth and formed at a thickness greater than that of the front end tooth.

3 Claims, 8 Drawing Sheets

MACHINE TOOL TRANSMISSION SYSTEM

FIELD OF THE INVENTION

The present invention relates to a transmission system and particularly to a machine tool transition system that transmits through gears.

BACKGROUND OF THE INVENTION

Providing spinning transmission through mated and engaged gears to make mechanical tools operating as desired is a commonly adopted technique.

For instance, U.S. Pat. No. 7,537,064 discloses a portable power tool that includes a housing, a motor with an output means, a driven element and a transmission means. The transmission means is located in the housing to receive spinning input from the output means of the motor, then a spinning output is generated and transmitted to an output shaft. The transmission means includes a plurality of planetary transmission stages each has an annular gear, a planetary bracket and a plurality of planetary gears. The planetary gears are held by the planetary bracket to engage with the annular gear.

R.O.C. utility patent M390361 discloses a power generation apparatus that converts kinetic energy generated by compression of wheels to electric power. It includes movable press plates on roads or rails run over by the wheels, holders beneath the movable press plates and a plurality of magnetic elements of the same polarity between the movable press plates and holders that are repulsive with each other. The movable press plates are located higher than the roads or rails, and include a gear rack on a lateral side and first, second and third gears at one side of the gear rack to transmit kinetic energy. The first gear is engaged with the gear rack and second gear, the second gear and third gear have respectively a transmission shaft in the center. The second gear and transmission shaft are interposed by a one-way bearing so that the second gear can spin only in one direction. The second and third gears are interposed by a volute spring. The third gear is engaged with a gear of a power generator. The movable press plates run over by the wheels generate kinetic energy released through the volute spring to drive the third gear spinning to drive the gear of the power generator to generate electric power.

All the aforesaid techniques provide transmission via a plurality of gears that generally are divided into a driving gear to receive power input, a transmission gear engaged with and driven by the driving gear, and a driven gear engaged with and driven by the transmission gear. The gears are engaged for spinning, and wearing takes place after a prolonged period of time that results in gradual reducing of tooth thickness and increasing of gear intervals. As a result, vibrations and noises are generated and operation sensitivity decreases during the machine tool is in operation, or even cause damage of the machine tool. Hence the gears with thinner teeth have to be replaced frequently. This causes a lot of troubles and higher repairs and maintenance costs for the machine tool in use. There are still rooms for improvement.

SUMMARY OF THE INVENTION

The primary object of the present invention is to solve the problem of conventional gears that have to be replaced frequently due to reducing of tooth thickness.

To achieve the foregoing object the present invention provides a machine tool transmission system that includes a driving assembly, a driven gear and at least one transmission gear. The driving assembly includes an input unit and a driving gear. The driving gear is connected to and driven by the input unit. The driving gear has a plurality of driving teeth. The driven gear is spaced from the driving assembly and has a plurality of driven teeth. The transmission gear is located between the driving gear and driven gear and engaged therewith, and has an axial direction and a plurality of transmission teeth. Each transmission tooth includes, in the axial direction, a front end tooth and a rear end tooth connecting to the front end tooth. The rear end tooth is formed at a tooth thickness greater than that of the front end tooth. The transmission tooth is movable in the axial direction and forms a first engaged position and a second engaged position. At the first engaged position the transmission tooth is engaged with the driving teeth and driven teeth via the front end tooth. At the second engaged position the transmission tooth is engaged with the driving teeth and driven teeth via the rear end tooth.

In order to achieve the foregoing object the present invention also provides another type of machine tool transmission system that includes a driving assembly, a driven gear and at least two positioning gears. The driving assembly includes an input unit and a driving gear. The driving gear is connected to and driven by the input unit. The driving gear has a plurality of driving teeth. The driven gear is adjacent to the driving assembly and engaged with the driving gear, and has a plurality of driven teeth. The positioning gears are engaged with the driving gear to aid steady spinning thereof. Each positioning gear has an axial direction and a plurality of positioning teeth. Each positioning tooth includes, in the axial direction, a front end tooth and a rear end tooth connecting to the front end tooth. The rear end tooth is formed at a tooth thickness greater than that of the front end tooth. The positioning tooth is movable in the axial direction and forms a first anchor position and a second anchor position. At the first anchor position the positioning tooth is engaged with the driving teeth via the front end tooth. At the second anchor position the positioning tooth is engaged with the driving teeth via the rear end tooth.

In order to achieve the foregoing object the present invention further provides another type of machine tool transmission system that includes a driving assembly, a driven gear and at least two retaining gears. The driving assembly includes an input unit and a driving gear. The driving gear is connected to and driven by the input unit. The driving gear has a plurality of driving teeth. The driven gear is adjacent to the driving assembly and engaged with the driving gear, and has a plurality of driven teeth. The retaining gears are engaged with the driven gear to aid steady spinning thereof. Each retaining gear has an axial direction and a plurality of retaining teeth. Each retaining tooth includes, in the axial direction, a front end tooth and a rear end tooth connecting to the front end tooth. The rear end tooth is formed at a tooth thickness greater than that of the front end tooth. The retaining tooth is movable in the axial direction and forms a first retaining position and a second retaining position. At the first retaining position the retaining tooth is engaged with the driven teeth via the front end tooth. At the second retaining position the retaining tooth is engaged with the driven teeth via the rear end tooth.

The invention, with the transmission tooth, positioning tooth and retaining tooth containing the front end tooth and rear end tooth, and the rear end tooth having the tooth thickness greater than the front end tooth, the transmission gear, positioning gears and retaining gears can engage first via the front end tooth with other gears. In the event that the front end tooth becomes thinner due to wearing, an adjustment in the axial direction can be made by forming engagement via the rear end tooth of a greater thickness, thus the lifespan of the transmission gear, positioning gears and retaining gears increases, and replacement frequency also can be reduced.

The foregoing, as well as additional objects, features and advantages of the invention will be more readily apparent from the following detailed description, which proceeds with reference to the accompanying drawings.

DETAILED DESCRIPTION OF THE PREFERRED EMBODIMENTS

Please refer to FIGS. 1, 2A through 2C for a first embodiment of the invention. The invention aims to provide a machine tool transmission system that includes a driving assembly 10, a driven gear 20 and two transmission gears 30. The driving assembly 10 includes an input unit 12 and a driving gear 11. In this embodiment the input unit 12 is a motor. The driving gear 11 is connected to and driven by the input unit 12. The driving gear 11 has a plurality of driving teeth 111. The driven gear 20 is spaced from the driving assembly 10 and connected to a driven member 22 driven by the driven gear 20. The driven gear 20 has a plurality of driven teeth 21. The transmission gears 30 are located between the driving gear 11 and driven gear 20 and engaged therewith on the left side and right side. Each transmission gear 30 has an axial direction 35 and a plurality of transmission teeth 31. Each transmission tooth 31 includes, in the axial direction 35, a front end tooth 311 and a rear end tooth 312 behind the front tooth 311 and connecting therewith. The front end tooth 311 and rear end tooth 312 form a tooth thickness gradually enlarged from the front end towards the rear end. The rear end tooth 312 is formed at a tooth thickness W2 greater than another tooth thickness W1 of the front end tooth 311.

Figure 1:
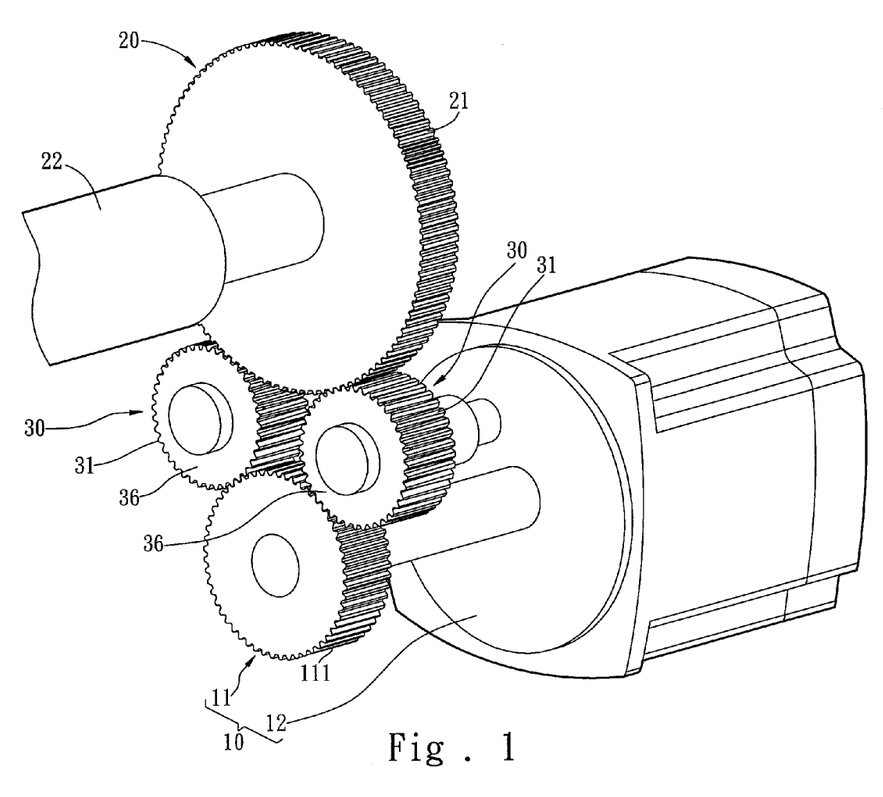
FIG. 1 is a perspective view of a first embodiment of the invention.
Figure 2A:
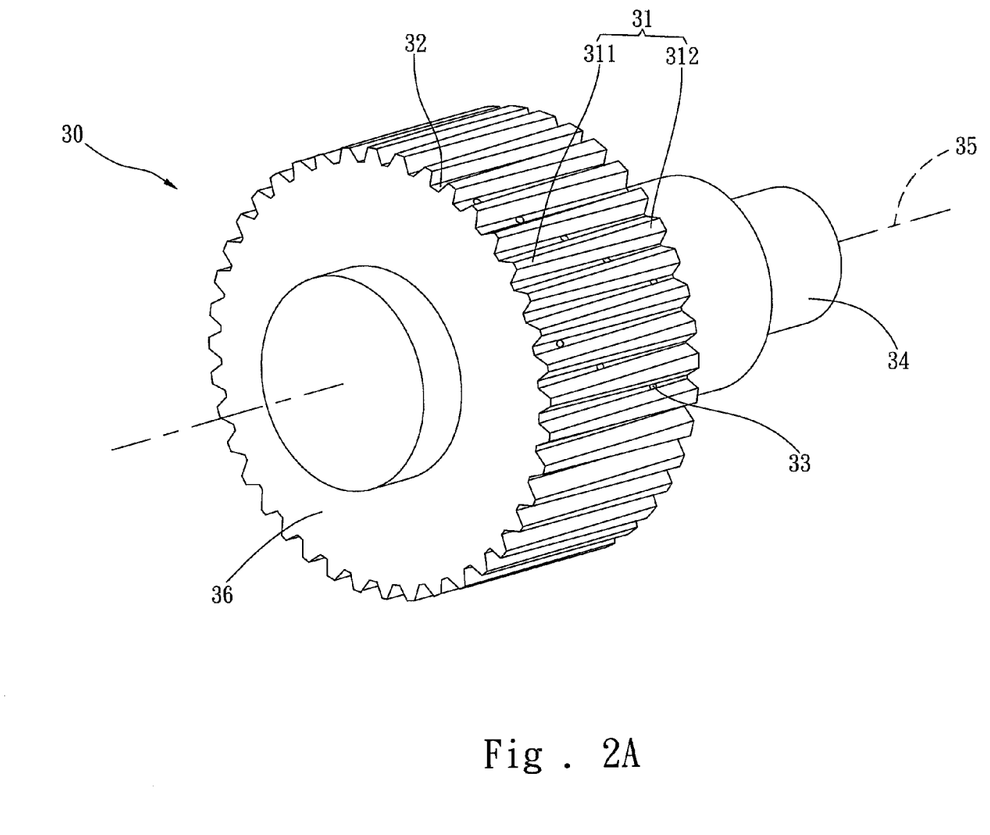
FIG. 2A is a perspective view of the transmission gear of the invention.
Figure 2B:
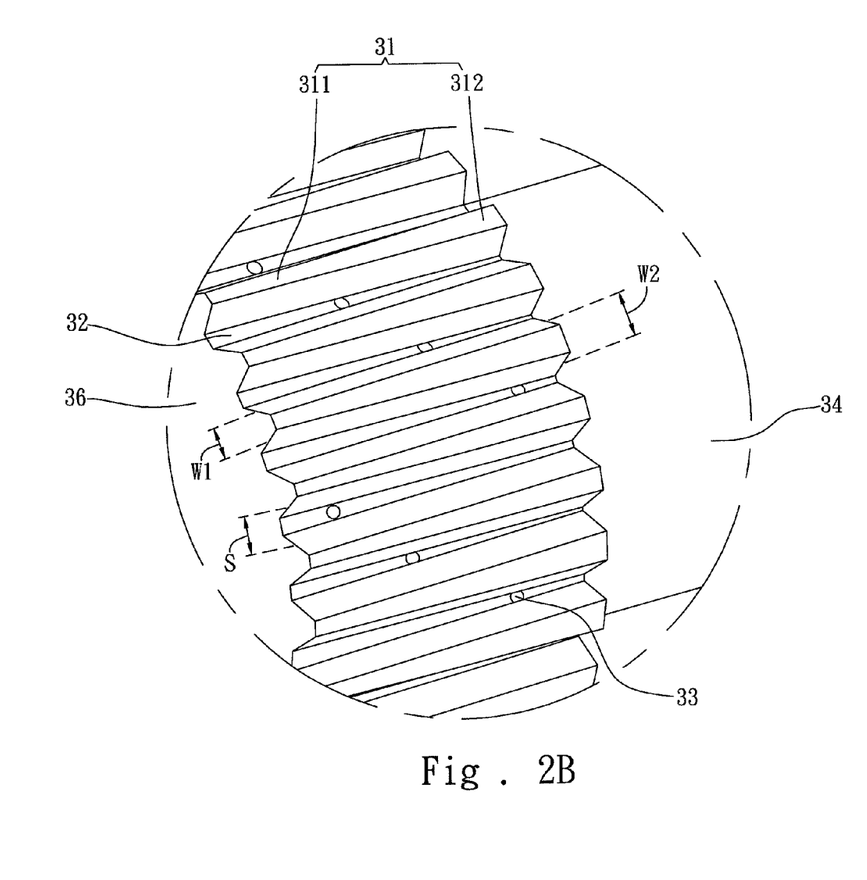
FIG. 2B is a fragmentary enlarged view of the transmission gear of the invention.
Figure 2C:
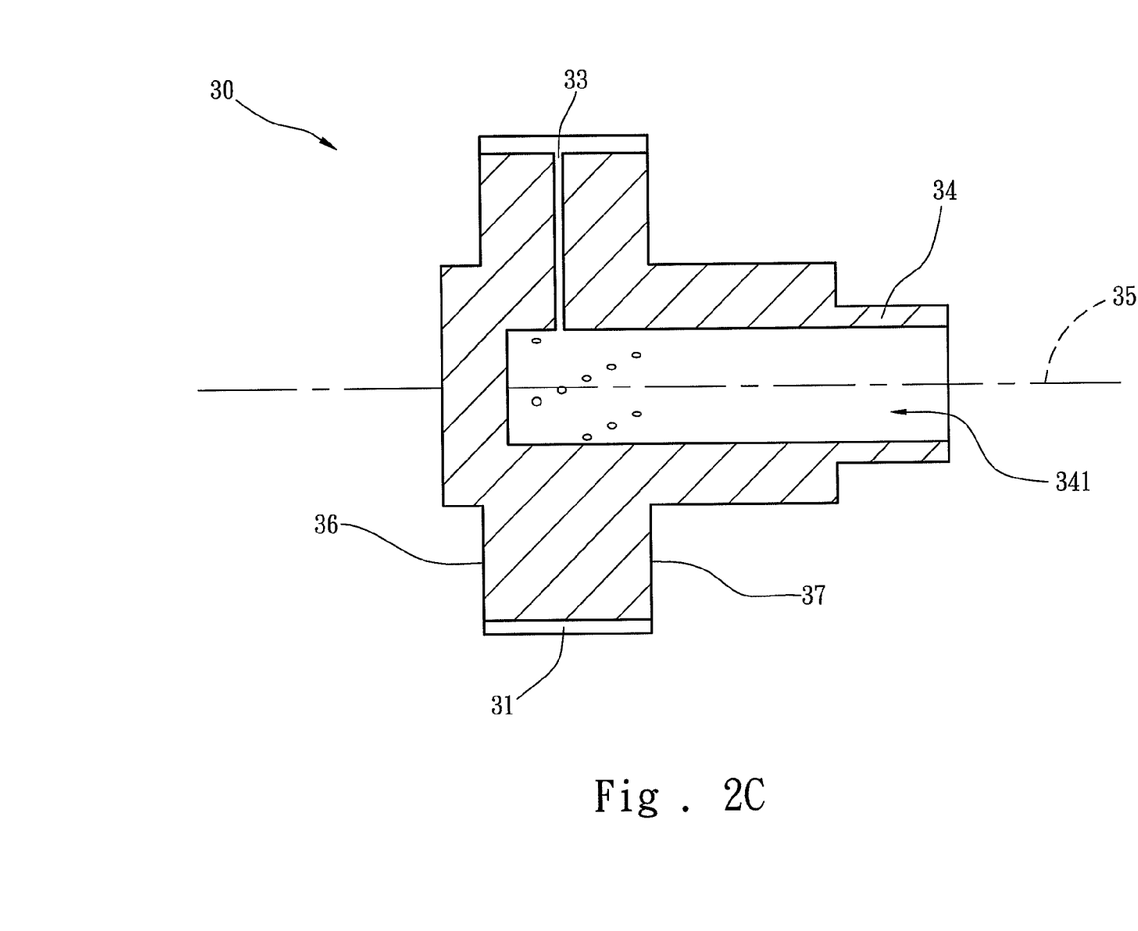
FIG. 2C is a sectional view of the transmission gear of the invention.

Referring to FIGS. 2A, 2B and 2C, in this embodiment the transmission teeth 31 are spaced from each other at a tooth interval S with a tooth interval bottom surface 32 between them, and an aperture 33 formed on the tooth interval bottom surface 32. Neighboring apertures 33 are spaced from each other in the axial direction 35 and arranged in a helical fashion. Moreover, each transmission gear 30 has a front end surface 36 and a rear end surface 37 opposite to the front end surface 36. The rear end surface 37 has a rear circular center. The transmission gear 30 further has a rotation shaft 34 on the rear circular center and perpendicular to the rear end surface 37. The rotation shaft 34 also has a passage 341 in the axial direction 35 run through the rear end surface 37 to communicate with the aperture 33.

Figure 3A:
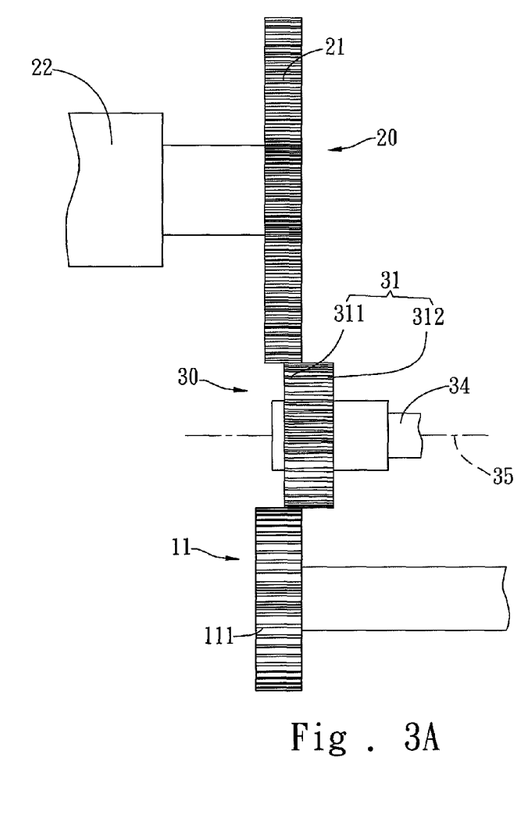
FIG. 3A is a schematic view of the transmission gear at the first engaged position according to the invention.
Figure 3B:
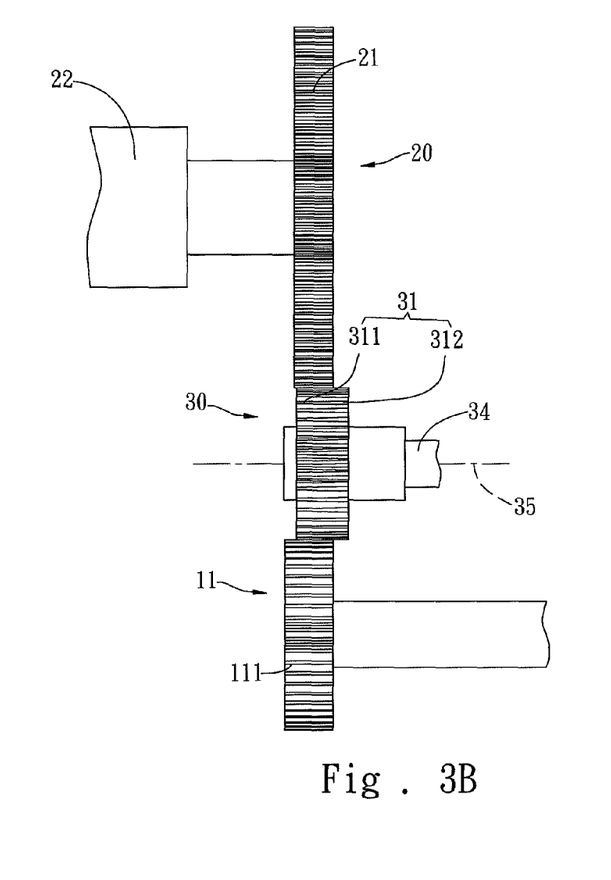
FIG. 3B is a schematic view of the transmission gear at the second engaged position according to the invention.

Also referring to FIGS. 3A and 3B, when this embodiment is in use, the transmission gear 30 is movable in the axial direction 35 to engage with the driving gear 11 and driven gear 20. The transmission gear 30 can be moved to a first engaged position and a second engaged position. At the first engaged position the transmission teeth 31 are engaged with the driving teeth 111 and driven teeth 21 via the front end tooth 311 (as shown in FIG. 3A) so that the transmission gear 30 can transmit the kinetic energy of the driving gear 11 to the driven gear 20 for spinning. When the tooth thickness W1 of the front tooth 311 becomes thinner because of wearing, the tooth interval S of the neighboring front end teeth 311 is greater, hence vibration, noise and deviation will occur to the engagement of the transmission gear 30 and the driving gear 11 and driven gear 20; by adjusting the transmission gear 30 to move in the axial direction 35 to the second engaged position (as shown in FIG. 3B), the rear end tooth 312 of a greater tooth thickness W2 engages with the driving teeth 111 and driven teeth 21, a steady engagement is accomplished. Moreover, the passage 341 of the rotation shaft 34 communicating with the apertures 33 can receive injection of lubrication oil and discharge thereof through the apertures 33 that are arranged in the helical fashion. Thus when the transmission gear 30 rotates the lubrication oil can be evenly distributed between the transmission teeth 31 and driving teeth 31, and between the transmission teeth 31 and driven teeth 21, thereby wearing of the transmission teeth 31 can be reduced and lifespan increases.

Figure 4:
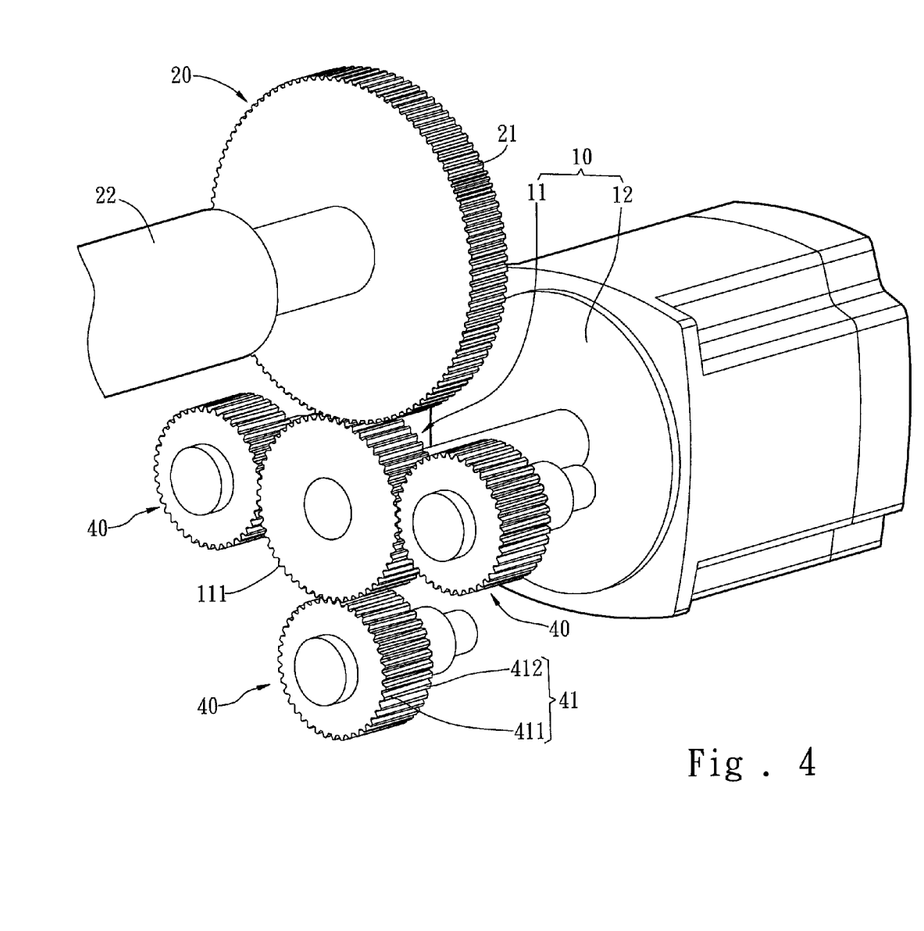
FIG. 4 is a perspective view of a second embodiment of the invention.

Please refer to FIG. 4 for a second embodiment of the invention. It differs from the first embodiment by directly engaging the driving gear 11 with the driven gear 20, hence no transmission gears 30 are provided. The driving gear 11 is surrounded by and engaged with at least two positioning gears 40 to aid steady rotation thereof. In this embodiment, three positioning gears 40 are provided spaced from the driven gear 20 that have the same structure as the transmission gears 30, such as with a plurality of positioning teeth 41 each has a front end tooth 411 and a rear end tooth 412, and a first anchor position and a second anchor position to engage with the driving teeth 111 so that the engagement between the positioning gears 40 and driving gear 11 can be adjusted to form steady engagement and rotation between the driving gear 11 and driven gear 20 without skewing.

Figure 5:
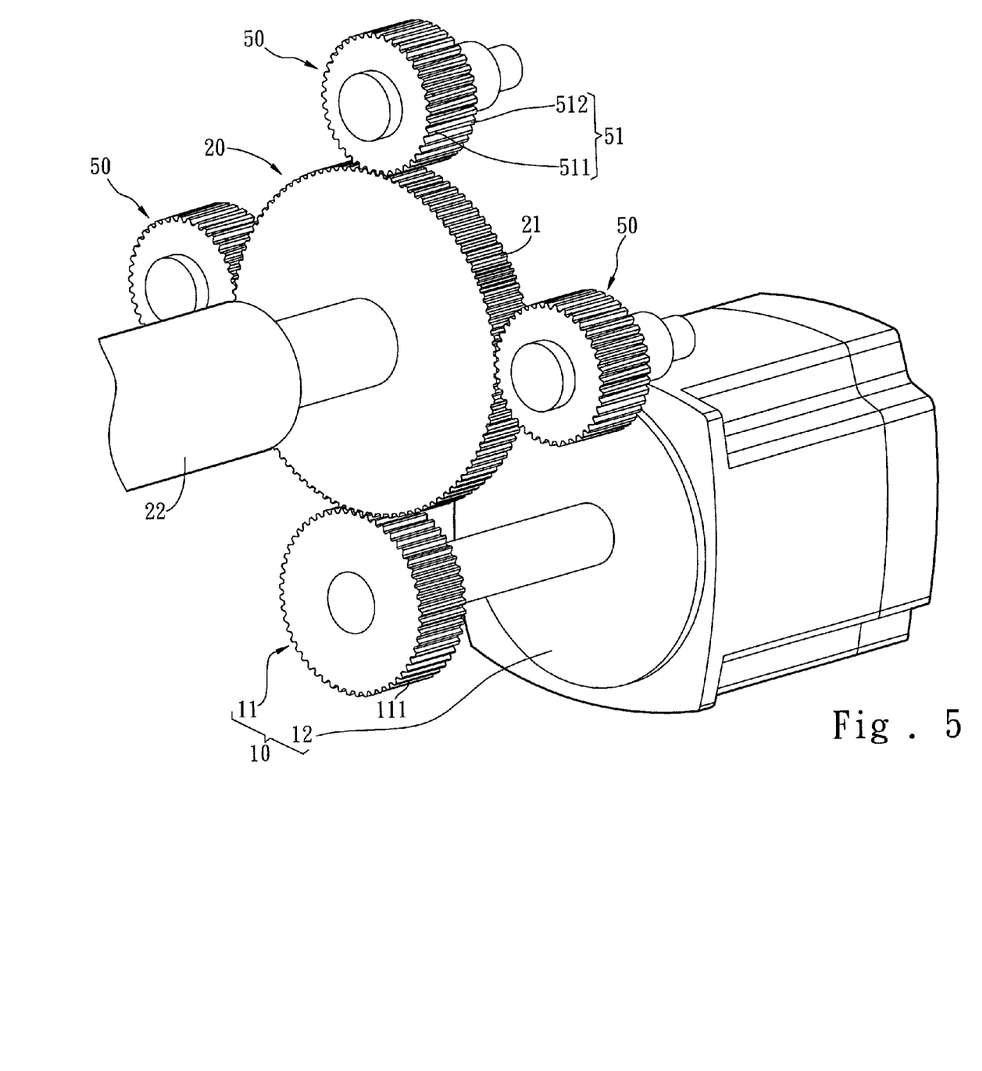
FIG. 5 is a perspective view of a third embodiment of the invention.

Please refer to FIG. 5 for a third embodiment of the invention. It differs from the first embodiment by directly engaging the driving gear 11 with the driven gear 20, hence no transmission gears 30 are provided. The driven gear 20 is surrounded and driven by at least two retaining gears 50 to rotate the driving gear 11 and aid steady rotation thereof. In this embodiment, three retaining gears 50 are provided spaced from the driving gear 11 that have the same structure as the transmission gears 30, such as with a plurality of retaining teeth 51 each has a front end tooth 511 and a rear end tooth 512, and a first retaining position and a second retaining position to engage with the driven teeth 21 so that the engagement between the retaining gears 50 and driven gear 20 can be adjusted to form steady engagement and rotation between the driven gear 20 and driving gear 11 without skewing.

As a conclusion, the invention, by providing the transmission gear, positioning gears and retaining gears that have respectively a front end tooth and a rear end tooth, and a greater tooth thickness on the rear end tooth than the front end tooth, the front end tooth can be engaged with other gears first; and when the front end tooth becomes thinner because of wearing the transmission gears, positioning gears and retaining gears can be adjusted axially to form engagement with the rear end tooth of greater thickness. Thus steady engagement among the gears can be formed without replacing any gears to maintain regular operation. The lifespan of the transmission gears, positioning gears and retaining gears also increases. Moreover, through the apertures formed on the tooth interval bottom surface between the teeth and helical arrangement thereof, lubrication oil can be injected through the passage of the rotation shaft and discharged through the apertures to be evenly distributed among the teeth to reduce wearing and further improve the lifespan of the gears. Thus it provides significant improvements over the conventional techniques.

While the preferred embodiments of the invention have been set forth for the purpose of disclosure, modifications of the disclosed embodiments of the invention as well as other embodiments thereof may occur to those skilled in the art. Accordingly, the appended claims are intended to cover all embodiments which do not depart from the spirit and scope of the invention.

What is claimed is:

1. A machine tool transition system, comprising:
    a driving assembly including an input unit and a driving gear connected to and driven by the input unit, the driving containing a plurality of driving teeth;
    a driven gear spaced from the driving assembly and contained a plurality of driven teeth; and
    at least one transmission ea which is located between the driving gear and the driven gear and engaged therewith, and includes an axial direction and a plurality of transmission teeth each including in the axial direction a front end tooth and a ear end tooth connecting to the front end tooth, the rear end tooth being formed at a thickness greater than that of the front end tooth, the transmission teeth being movable in the axial direction to engage with the driving teeth and the driven teeth via the front end tooth at a first engaged position and engage with the driving teeth and the driven teeth via the rear end tooth at a second engaged position;
    wherein two neighboring transmission teeth are spaced from each other at a tooth interval to form a tooth interval bottom surface and form an aperture on the tooth interval bottom surface to hold lubrication; wherein neighboring apertures are spaced from each other at a selected distance in the axial direction.

2. The machine tool transition system of claim 1, wherein the front end tooth and the rear end tooth are formed at a thickness gradually increased in the axial direction from a front end to a rear end.

3. The machine tool transition system of claim 1, wherein the transmission gear includes a rotation shaft which contains a passage in the axial direction to communicate with the aperture.

* * * * *